United States Patent [19]

Coroneos

[11] Patent Number: 4,648,153
[45] Date of Patent: Mar. 10, 1987

[54] APPARATUS FOR PACKING AND FORMING GROUND BEEF

[76] Inventor: James H. Coroneos, 2205 Frederick Rd., Baltimore, Md. 21228

[21] Appl. No.: 640,446

[22] Filed: Aug. 13, 1984

[51] Int. Cl.⁴ ................................................ A22C 7/00
[52] U.S. Cl. ........................................ 17/32; 426/513; 53/122
[58] Field of Search ................ 17/32; 53/122; 241/74, 241/82.1, 89.2; 249/160, 163, 164, 219 R; 425/542, 567, 569, 571, 595; 426/414, 491, 512, 513, 515

[56] References Cited

U.S. PATENT DOCUMENTS

| | | | |
|---|---|---|---|
| 1,044,438 | 11/1912 | Briggs | 17/32 X |
| 2,021,794 | 11/1935 | Leone | 17/32 |
| 2,337,406 | 12/1943 | Opie | 17/32 X |
| 2,635,799 | 4/1953 | Hoy | 17/32 X |
| 2,729,947 | 1/1956 | Cheney | 17/32 |
| 3,237,662 | 3/1966 | Hawley | 17/32 X |
| 3,535,735 | 10/1970 | Egee | 17/32 |
| 3,777,331 | 12/1973 | Falborg | 17/32 |
| 4,245,373 | 1/1981 | Coroneos | 17/32 |
| 4,483,046 | 11/1984 | Briddell | 17/32 |

FOREIGN PATENT DOCUMENTS 7854  1/1898  Norway ................................ 17/32

Primary Examiner—John Sipos
Assistant Examiner—Steven P. Weihrouch
Attorney, Agent, or Firm—Walter G. Finch

[57] ABSTRACT

The invention concerns an apparatus for processing and forming meat for cooking on a vertical rotisserie. The apparatus is utilized in conjunction with a standard meat grinding/mixing system. A portion of the apparatus attaches directly to a standard ground beef mixer such that the rotating motion of the mixer worm is utilized to force meat into a conical mold. Manipulation of a vent allows air to exit and the ground meat to easily enter the mold. Once the meat begins to exit the vent, the vent is closed, causing the meat to be packed into the conical mold by the mixer worm. The mold is then detached, inverted and the pre-measured, conical piece of packed beef is easily removed. A rod within the conical mold forms a skewer hole for future skewering on the vertical rotisserie.

40 Claims, 5 Drawing Figures

APPARATUS FOR PACKING AND FORMING GROUND BEEF

BACKGROUND OF THE INVENTION

The invention concerns an apparatus for vacuum packing and forming ground beef (e.g., gyros) such that it can be mounted on a vertical rotisserie for cooking.

In the past, meat which was to be cooked on vertical rotisseries has been prepared in a time consuming fashion. Pieces of beef are typically fed into a grinder where they are ground, the ground meat then being fed to a mixer. Seasonings are added to the mixer and are mixed with the ground beef to flavor as desired. The ground, seasoned meat is then portioned out by weight and is thoroughly kneaded to remove air from the meat. To facilitate cooking on a vertical rotisserie, the meat is formed into conical pieces and frozen. The frozen meat is later skewered and cooked on the vertical rotisserie. As an improvement to the prior technique, it was proposed that the ground meat be packed into cylinder molds with a vacuum producing machine, the packed meat then being trimmed to a conical form. However, such a vacuum machine costs approximately four times the price of a standard grinder/mixer. Obviously, the use of such a device is cost prohibitive.

The necessity of portioning the meat and kneading the meat was overcome by U.S. Pat. No. 4,245,373 to Coroneos. According to Coroneos, the seasoned, ground beaf is placed into a cylindrical mold and is compressed therein forming a pre-weighed portion. Compression of the meat with a lever-operated press removes air from the meat, thus avoiding the step of kneading. A tubular portion is provided in the center of the mold which forms a center hole in the molded meat for easy mounting on a vertical rotisserie. Three or four such beef cylinders are stacked on a skewer of a vertical rotisserie for cooking.

OBJECTS AND SUMMARY OF THE INVENTION

An object of the invention is to provide an inexpensive apparatus which facilitates the forming of meat, particularly beef sections for cooking on vertical rotisseries.

Another object of the invention is to provide a device which avoids the necessity of kneading ground beef in that the beef is automatically compressed.

A further object is to provide beef in portions which are pre-shaped into conical sections.

A still further object of the invention is to yield conical beef sections that are pre-measured by weight.

An additional object of the invention is to provide a beef section with a pre-formed skewer hole to facilitate mounting on a vertical rotisserie.

These and other objects of the invention are apparent from the specification below.

The invention which accomplishes these objects concerns an apparatus which attaches to a standard meat grinder/mixer. The apparatus comprises a tubular flange having two projections or studs, which is attached to the outlet of a standard mixer. A cylindrical connecting member with slots mounts over the tubular flange and the studs engage the slots in a manner of a bayonet mount. Extending radially from the cylindrical connecting member and integral thereto is a circular plate having a locking collar. A conical mold, with a plastic liner, is provided which forms the meat into pre-weighed portions. At its wider end, the conical mold has an annular lip which has the same outer diameter as the circular plate and is secured thereto via the locking collar. At the narrow end of the conical mold is a vent having a plurality of slots. As ground meat is forced into the cone, air exits via the slots of the vent. Once meat begins to exit the slot, the vent is closed by means of a handle and the meat is compressed by the action of the mixer worm into the closed conical mold. The conical mold is provided with an internal coaxial rod which is attached to the narrow end of the conical mold. Over the rod, a plastic tube is slipped for forming and maintaining the skewer hole in the beef section. When the conical mold has been packed with meet, the locking collar is removed from the mold and the excess meat is scraped away from the annular lip. The mold is then inverted and the plastic liner removed. The plastic tube is retained within the meat section to insure that the weight of the meat does not close the skewer hole. The pre-formed, pre-measured conical beef section may then be frozen for later use.

DETAILED DESCRIPTION OF THE INVENTION

Figure 1:
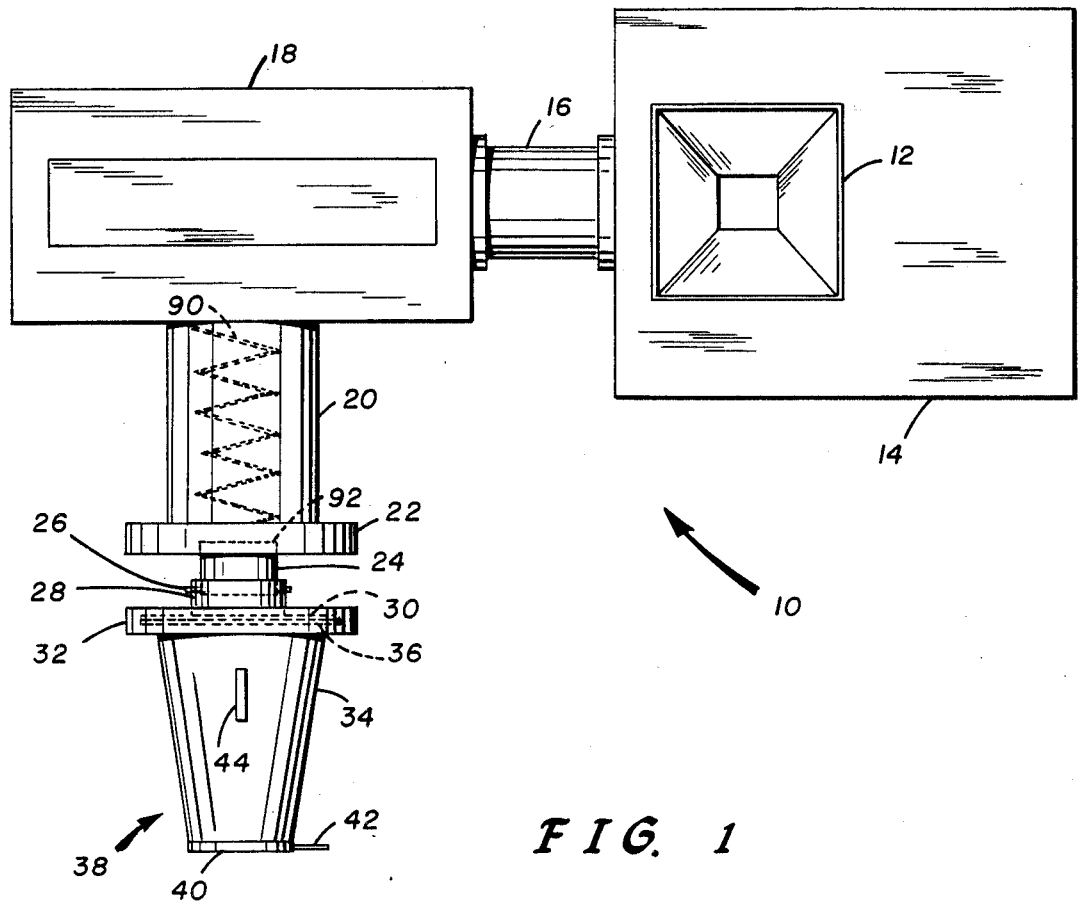
FIG. 1 shows a schematic of the invention in its environment.

FIG. 1 shows the invention in its environment. A typical meat grinder/mixer apparatus is shown generally at 10. Meat is fed via a hopper 12 into a meat grinder 14 where the meat is ground. The meat then travels through a connector 16 into a mixer 18. Seasonings are added as desired through the top of the mixer 18 to flavor the ground beef therein. A worm 90 within the mixer 18 forces the ground, seasoned meat through a cylindrical feed-tube 20. At this point the meat is ground, but coarse, and is therefore reinserted at the hopper 12 to be reground until fine. A threaded collar 22, also part of the standard grinder/mixer 10, normally secures in position a perforated grinding plate 92 through which the ground meat exits. The apparatus according to the present invention (discussed in detail below) may be connected to the grinder/mixer 10 with the perforated plate 92 in place during the regrinding of the meat, or with the perforated plate 92 removed after the reground meat is fed into the mixer 18 (in this manner the worm 90 may be utilized to force the ground meat directly into the proposed apparatus). With respect to the present invention the threaded collar 22 is removed from the cylindrical feed tube 20 and a tubular flange 24 is placed thereagainst. The threaded collar 22 is turned on to the cylindrical feed-tube to 20 such that the tubular flange is maintained in position. The tubular flange 24 is provided with, in the preferred embodiment, two studs 26 to which a cylindrical connecting member 28 is secured in a bayonet mount manner. Integral with the cylindrical connecting member 28 is a circular plate 30 to which an annular locking collar 32 is mounted. One portion of the annular locking collar 32 is integral with the circular plate 30, and another portion is hinged to pivot away from the circular plate 30. This aspect is discussed in greater detail with respect to FIG. 2. A conical mold 34 is shown with an annular lip 36 adjacent to the circular plate 30. The annular locking ring 32 secures the annular lip 36 adjacent to the circular plate 30 in tight fashion. At the narrow end 38 of the conical mold 34 is a vent 40 which is controlled by handle 42. As meat enters the conical mold from the mixer 18 the handle 42 is manipulated such that the vent 40 is open to allow air within the conical mold 34 to escape. Once meat begins to exit openings (not shown) in the vent 40, the handle 42 is used to close the vent 40. The action of the worm (not shown) of the mixer 18 causes meat to be compressed in and formed into the conical mold 34. The annular locking collar 32 is released once the conical mold 34 is filled with meat which is then is grasped by handles 44 and inverted. The conically formed meat portion slides easily from the conical mold 34 owing to features discussed in greater detail with respect to FIG. 2.

Figure 2:
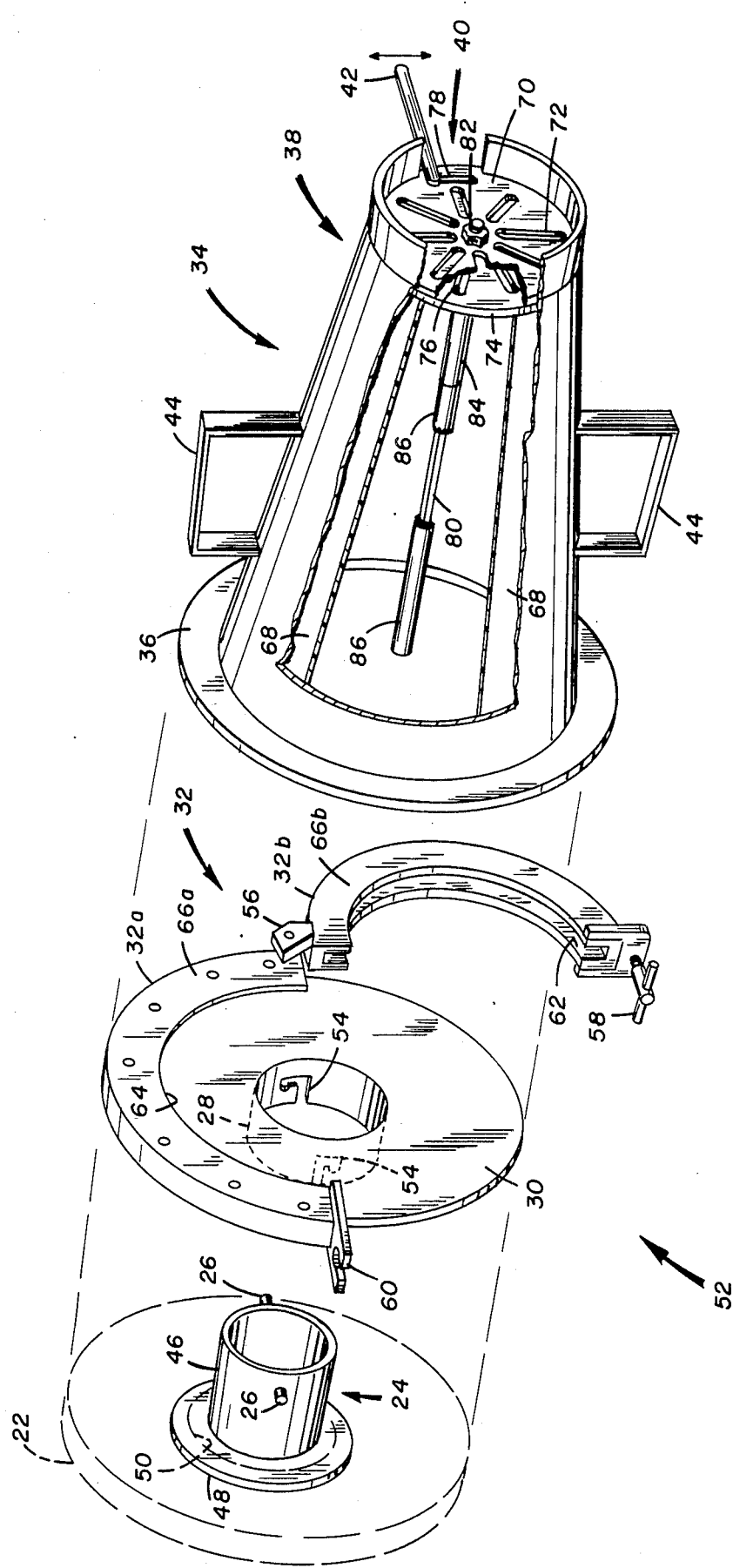
FIG. 2 reveals a breakaway view of the invention.

FIG. 2 reveals the details comprising the present invention. Here it is evident that the tubular flange 24 constitutes a tubular portion 46 with an integral flange 48 at one end. The tubular flange is positioned such that the tubular portion 46 passes through a round opening 50 of the threaded collar 22 (both shown in dashed lines), while the flange 48 is large enough to engage a surface of the threaded collar 22. Thus, when the threaded collar 22 is turned onto the cylindrical feedtube 20 (see FIG. 1), the tubular flange 24 is securely fastened to the grinder/mixer 10. A locking assembly generally depicted at 52 is provided with a cylindrical connecting member 28 which has two J-slots 54. The cylindrical connecting member 28 has an inner diameter which is greater than the outer diameter of the tubular portion 46. Accordingly, the cylindrical connecting member 28 is slipped over the tubular portion 46 such that the slots 54 align with the studs 26. A subsequent twisting motion of the locking assembly fastens the locking assembly to the tubular flange in the manner of a bayonet lock. Integral with the cylindrical connecting member 28 is an integral circular plate 30 having a substantially large diameter. About one portion of the circular plate 30 circumference and integral therewith is a first half of the locking collar 32a. A second half of the locking collar 32b is pivotable with respect to the first half 32a, opening and closing about the remaining circumference of the circular plate 30. The two halves of the locking collar 32a, 32b are hinged at one end and are lockable at the other. The hinge is shown at 56 while a twist-lock is visible at 58. When the second locking collar portion 32b is closed about the circular plate 30, the twist-lock 58 is slipped into engagement with the notched tab 60, and twisted to secure the locking collar portion 32b in position. It is evident that upon closure of the second locking collar portion 32b, circular plate 30 fits into a semi-annular slot 62. However, it should be noted that the semi-annular slot 62 is thicker than the circular plate 30 and that the integral portion of the locking collar 32a is also provided with a semi-annular slot 64. Thus, with the second locking collar portion 32b closed about the circular plate 30, a full annular slot (62, 64) is provided in the locking collar 32 beneath the faces 66a, 66b of the locking collar 32. The function of this annular slot is discussed below.

The conical mold, shown at 34, is provided with an annular lip 36 at its wider end. The diameter of the annular lip 36 is substantially equal to that of the circular plate 30. With the second locking collar portion 32b open, the conical mold 34 is grasped by handles 44 and is urged toward the circular plate 30. As viewed in FIG. 2, the conical mold 34 is then slid upward such that the annular lip 36 slides into the semi-annular slot 64. The second locking collar portion 32b is then closed and locked as discussed above. As assembled, the locking collar 32 insures full contact between the circular plate 30 and the annular lip 36. Lining the inner surface of the conical mold 34 is a plastic liner 68 which is placed inside the conical mold 34 prior to its engagement with the circular plate 30. Meat pressed into a mold without such a lining tends to stick to the inner surfaces of the mold. Accordingly, this plastic liner 68 facilitates removal of the meat which has been forced into the conical mold 34 in accordance with this invention. At the narrow end of the conical mold 34 is a vent 40 consisting of a stationary plate 70 having a plurality of slots 72, and a rotatable plate 74 which is provided with similar slots 76. The handle 42 is connected to the rotatable plate 74 through the stationary plate 70 via an arcuate slot 78. Manipulation of the handle 42 downward causes the slots 72, 76 to align, thus venting the conical mold 34. Conversely, movement of the handle 42 in an upward direction misaligns the slots 72, 76, thereby closing the vent 40. As meat enters the conical mold 34 the vent 40 is normally in its open position to allow the escape of air from the conical mold 34. As the conical mold begins to fill with meat, some excess meat will exit the aligned slots 72, 76, at which time the vent 40 is closed causing the meat to be compressed into the conical mold 34. Obviously, the meat takes a generally conical form, and is provided with a central aperture owing to the provision of a rod 80. One end of the rod 80 is connected to the stationary plate 70 by means of a nut 82 within the conical mold 34 while the opposite end of the rod 80 is free. The rod 80 is coaxial with the longitudinal axis of the conical mold 34. Surrounding the rod 80 are two plastic tubes 84 and 86 which slip over the rod 80 in the manner of a sleeve. When the conical mold 34 is removed from engagement with the locking collar 32 and inverted, the formed meat section slides easily from the conical mold 34, wrapped in the plastic liner 68. Contained within the formed meat section is the tube 86 while the tube 84 acting as a spacer remains in the conical mold 34. The purpose of the tube 86 is to insure that the weight of the formed meat section does not collapse the central hole formed by the tube 86. This hole is the means by which the meat section is mounted on the skewer of a vertical rotisserie. The formed meat section may then be frozen and stored for later use.

Figure 3:
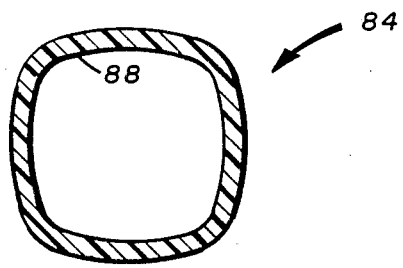
FIG. 3 is a cross-sectional view of the plastic tube 84 portrayed in FIG. 2.

FIG. 3 shows a cross-sectional view of the tubes 84, 86. As can be seen the tube outer surface is substantially cylindrical with somewhat squared corners. As such, the tube will easily fit over the skewer of a vertical rotisserie having a square or circular cross-section. The internal surface 88 shaped as such will frictionally engage either skewer in a manner which prevents slipping of the meat section while the skewer rotates.

Figure 4:
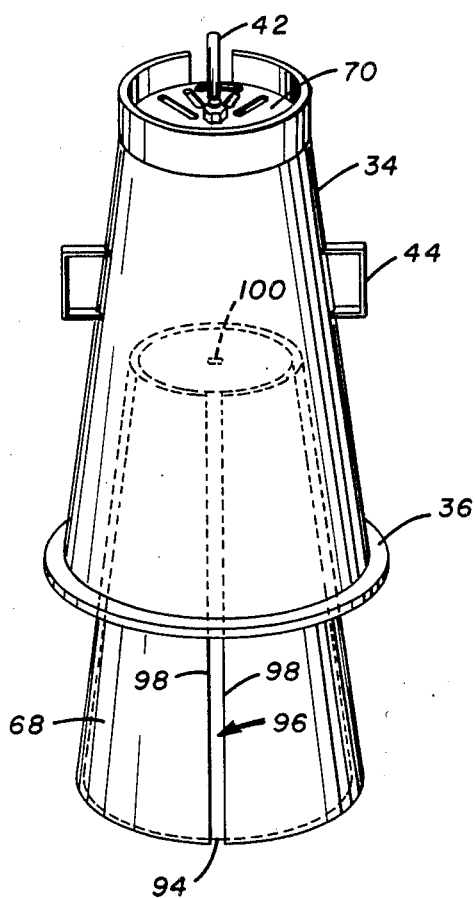
FIG. 4 provides a view of a lined conical beef section being removed from a conical mold 34.

FIG. 4 shows a conical meat section 94 being removed from the conical mold 34, wrapped in the plastic liner 68. It is evident that the plastic liner 68 does not completely surround the conical meat section 94, but is provided with a gap 96 to facilitate removal of the plastic liner 68. Accordingly, an individual may easily grasp the edges 98 of the liner 68 to peel the liner 68, which strongly adheres to the conical meat section owing to the vacuum packing of the meat within the conical mold 34, from the conical meat section 94. At the center of the conical meat section 94, the central apperature 100 is evident, which is formed by the rod 80 and the tube 84 of FIGS. 2 and 3.

Figure 5:
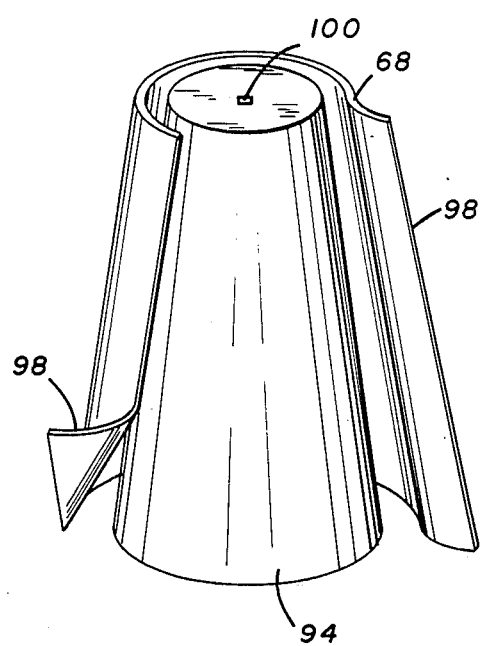
FIG. 5 shows the liner 68, partially peeled from the conical meat section.

FIG. 5 shows the conical meat section 94 with the plastic liner 68 substantially removed therefrom. As mentioned with respect to FIG. 4, the edge 98 is grasped and the liner 68 is peeled away to reveal a conical shaped meat section of a desired, pre-determined weight, with a central apperature which facilitates mounting on a vertical rotisserie.

Other modifications are apparent to one skilled in the art which do not depart from the spirit of the invention. For instance, the conical mold 34 may have any variety of shape or volume, allowing for the formation of meat in 15 to 25 pound sections. The locking collar 32 may be comprised of two portions which are not both semi-circular: the second locking collar 32b may be larger than the first locking collar portion 32a. Various mechanisms may be employed to secure the cylindrical connecting member 28 to the tubular flange 24. The tube 84 may have a round cross-section and a cylindrical inner surface with an integral rib for engaging the rotisserie skewer. Accordingly, the described embodiments, are, therefore, considered to be only illustrative and not restrictive; the scope of the invention being defined by the appended claims.

What is claimed is:

1. An apparatus attached to a meat processing device having a forcing means which forces meat therethrough, the apparatus comprising:
   a connecting means attached to the processing device;
   a locking collar having a mounting means for mounting the locking collar to the connecting means; the locking collar comprising:
      a circular plate with an integral first annularly slotted ring section about the circumference of the circular plate;
      a second annularly slotted ring section; and
      a means for pivotably connecting the first and second ring portions to each other;
   and, a mold having an annular lip at a first end and a second end, the first and second annularly slotted ring sections engaged with the mold annular lip via their annular slots;
wherein the meat exits the processing device, passes through the connecting means, into the mold where the meat is compressed and formed.

2. An apparatus as in claim 1, the connecting means comprising a tubular flange connected to the meat processing device.

3. An apparatus as in claim 2, the mounting means comprising a cylindrical connecting member which connects to the tubular flange.

4. An apparatus as in claim 3, the tubular flange having at least one stud, and the cylindrical connecting member having at least one slot which is engaged by at least one stud.

5. An apparatus as in claim 4, the locking means further comprising a locking mechanism which locks the first ring section to the second ring section opposite the means for pivotably connecting, about the circular plate.

6. An apparatus as in claim 5, the mold being conical, the mold first end having a diameter greater than the second end.

7. An apparatus as in claim 5, the mold second end having a means for venting the mold such that air exits the mold as meat is compressed therein.

8. An apparatus as in claim 7, the means for venting comprising:
   a first plate having slots, integral with the mold second end; and
   a rotatable, second plate with slots, that are alignable the slots of the first plate.

9. An apparatus as in claim 8, the means for venting also comprising a handle connected to the rotatable second plate for movement thereof.

10. An apparatus as in claim 9, the mold having an inner surface wherein a linear is positioned in the mold against the mold inner surface.

11. An apparatus as in claim 10, the mold having an exterior surface to which at least one handle is attached.

12. An apparatus as in claim 1, the mold second end having a means for venting the mold such that air exits the mold as meat is compressed therein.

13. An apparatus as in claim 12, the means for venting comprising:
   a first plate having slots, integral with the mold second end; and
   a rotatable, second plate with slots that are alignable with the slots of the first plate.

14. An apparatus as in claim 13, the means for venting also comprising a handle connected to the rotatable second plate for movement thereof.

15. An apparatus as in claim 14, the mold having a substantially elongated cylindrical shape, wherein a rod is attached to the mold second end inside the mold and coaxially therewith.

16. An apparatus as in claim 15, wherein a tube slidably engages the rod in the manner of a sleeve.

17. An apparatus as in claim 16, the tube having a substantially cylindrical exterior surface and a frictionally engaging interior surface.

18. An apparatus as in claim 17, the mold having an inner surface wherein a liner is positioned in the mold against the mold inner surface.

19. An apparatus as in claim 18, the mold having an exterior surface to which at least one handle is attached.

20. An apparatus as in claim 19, the connecting means comprising a tubular flange connected to the meat processing device.

21. An apparatus as in claim 20, the mounting means comprising a cylindrical connecting member which connects to the tubular flange.

22. An apparatus as in claim 21, the tubular flange having at least one stud, and the cylindrical connecting member having at least one slot which is engaged by the at least one stud.

23. An apparatus as in claim 22, the locking means further comprising a locking mechanism which locks the first ring section to the second ring section opposite the means for pivotably connecting, about the circular plate.

24. An apparatus as in claim 23, the mold being conical, the mold first end having a diameter greater than the second end.

25. An apparatus as in claim 1, the mold having a substantially elongated cylindrical shape, wherein a rod is attached to the mold second end inside the mold and coaxially therewith.

26. An apparatus as in claim 25, wherein a tube slidably engages the rod in the manner of a sleeve.

27. An apparatus as in claim 26, the tube having a substantially cylindrical exterior surface and a frictionally engaging interior surface.

28. An apparatus as in claim 27, the connecting means comprising a tubular flange connected to the meat processing device.

29. An apparatus as in claim 28, the mounting means comprising a cylindrical connecting member which connects to the tubular flange.

30. An apparatus as in claim 29, the tubular flange having at least one stud, and the cylindrical connecting member having at least one slot which is engaged by the at least one stud.

31. An apparatus as in claim 30, the mold having an inner surface wherein a liner is positioned in the mold against the mold inner surface.

32. An apparatus as in claim 31, the mold having an exterior surface to which at least one handle is attached.

33. An apparatus as in claim 32, the mold second end having a means for venting the mold such that air exits the mold as meat is compressed therein.

34. An apparatus as in claim 33, the means for venting comprising:
a first plate having slots integral with the mold second end; and
a rotatable, second plate with slots that align with the slots of the first plate.

35. An apparatus as in claim 34, the means for venting also comprising a handle connected to the rotatable second plate for movement thereof.

36. An apparatus as in claim 1, the mold second end having a means for venting the mold such that air exits the mold as meat is compressed therein.

37. An apparatus as in claim 36, the means for venting comprising:
a first plate having slots, integral with the mold second end; and
a rotatable, second plate with slots that are alignable with the slots of the first plate.

38. An apparatus as in claim 37, the means for venting also comprising a handle connected to the rotatable second plate for movement thereof.

39. An apparatus as in claim 38, the mold having an inner surface wherein a liner is positioned in the mold against the mold inner surface.

40. An apparatus as in claim 39, the mold having an exterior surface to which at least one handle is attached.

* * * * *